US011541633B2

(12) United States Patent
Bihamta et al.

(10) Patent No.: US 11,541,633 B2
(45) Date of Patent: Jan. 3, 2023

(54) HYBRID PARTS INCLUDING ADDITIVE MANUFACTURING

(71) Applicant: GM GLOBAL TECHNOLOGY OPERATIONS LLC, Detroit, MI (US)

(72) Inventors: Reza Bihamta, Windsor (CA); Ali Shabbir, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 16/739,523

(22) Filed: Jan. 10, 2020

(65) Prior Publication Data

US 2021/0213706 A1    Jul. 15, 2021

(51) Int. Cl.
*B32B 7/12* (2006.01)
*B29C 64/147* (2017.01)
*B33Y 10/00* (2015.01)
*B33Y 80/00* (2015.01)

(52) U.S. Cl.
CPC .............. *B32B 7/12* (2013.01); *B29C 64/147* (2017.08); *B32B 2250/40* (2013.01); *B33Y 10/00* (2014.12); *B33Y 80/00* (2014.12)

(58) Field of Classification Search
CPC ... B29C 64/147; B29C 64/106; B29C 64/112; B29C 64/118; B29C 64/245; B32B 2250/40; B32B 7/12; B32B 15/14; B32B 15/18; B32B 15/20; B32B 2250/44; B32B 2262/101; B32B 2262/106; B32B 2307/732; B32B 3/08; B32B 5/02; B32B 5/26; B33Y 10/00; B33Y 80/00
See application file for complete search history.

(56) References Cited

U.S. PATENT DOCUMENTS

| 2001/0051255 | A1* | 12/2001 | Fields ................... B32B 7/12 428/209 |
| 2003/0087572 | A1 | 5/2003 | Balthes et al. |
| 2007/0146734 | A1* | 6/2007 | Taniuchi ............. B33Y 30/00 358/1.18 |
| 2013/0077996 | A1* | 3/2013 | Hanson .............. G03G 15/224 399/130 |
| 2014/0268607 | A1* | 9/2014 | Wicker .............. H05K 1/0296 29/33 M |
| 2015/0080495 | A1* | 3/2015 | Heikkila ............ B22F 1/065 264/642 |
| 2018/0095450 | A1* | 4/2018 | Lappas ................ B33Y 10/00 |
| 2018/0339478 | A1* | 11/2018 | Lee ...................... A43B 3/0078 |
| 2020/0079013 | A1* | 3/2020 | Linde .................. B33Y 70/10 |
| 2021/0213706 | A1* | 7/2021 | Bihamta ................ B32B 5/26 |

FOREIGN PATENT DOCUMENTS

| CN | 110198838 A | 9/2019 |
| CN | 110520282 A | 11/2019 |

* cited by examiner

*Primary Examiner* — Sonya M Sengupta
(74) *Attorney, Agent, or Firm* — Quinn IP Law

(57) ABSTRACT

A hybrid part includes a base structure and a plurality of layers of additive manufacturing material disposed on and attached to the base structure. The base structure may includes a plurality of sheets of base material, and/or a base formed by any non-additive manufacturing method. A method of forming a hybrid part includes providing a base structure that includes either or both of: a) a plurality of sheets of base material, and b) a base formed by a non-additive method. The method further includes disposing a plurality of layers of additive manufacturing material, layer by layer, onto the base structure.

20 Claims, 3 Drawing Sheets

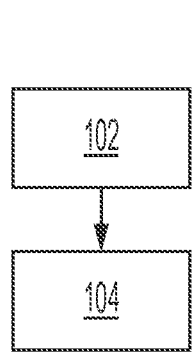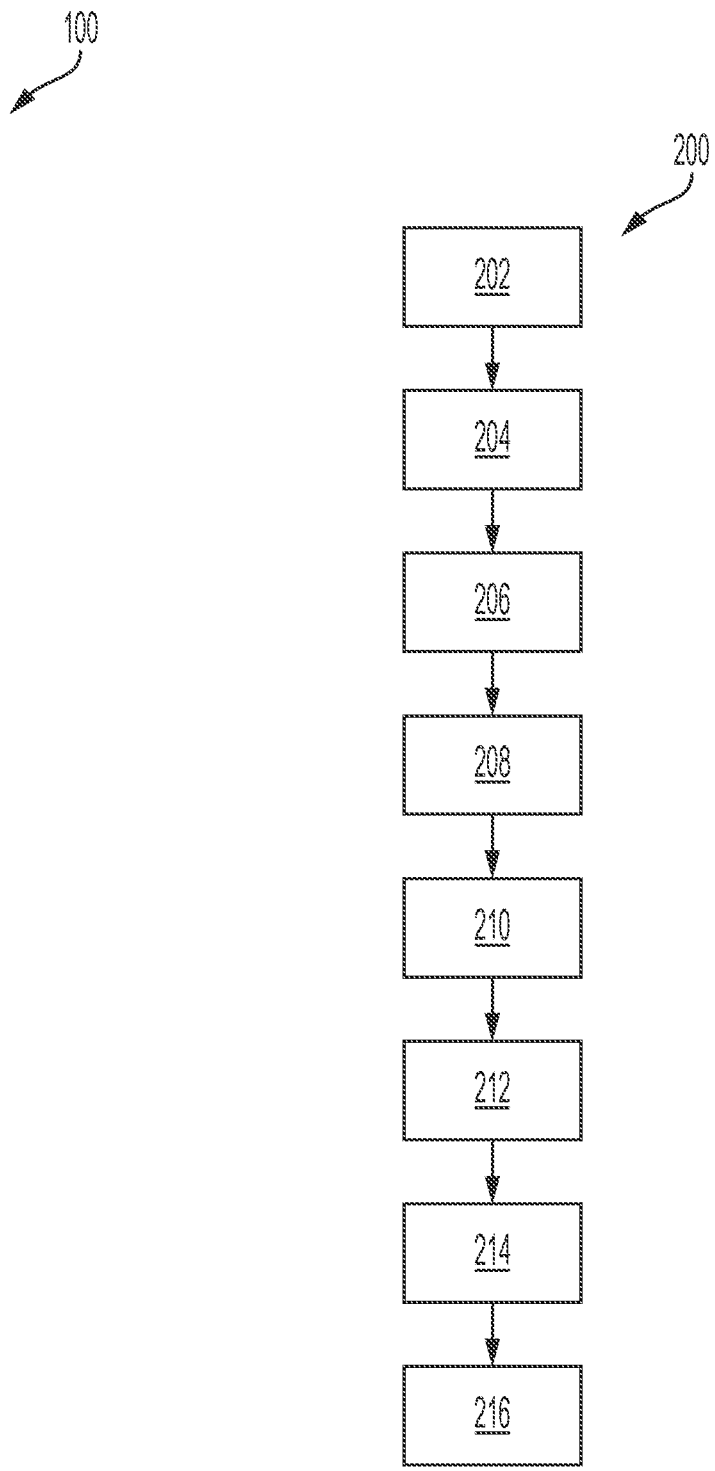

HYBRID PARTS INCLUDING ADDITIVE MANUFACTURING

FIELD

The present disclosure relates to a hybrid part, of which a portion is formed by additive manufacturing, and a method of forming a hybrid part.

INTRODUCTION

Additive manufacturing, also known as 3-D printing, refers to a process for creating a three-dimensional object through automated control by sequential layer material addition/joining within a three-dimensional work envelope. Objects can be manufactured in various shapes and geometries and can include sacrificial or support materials, enabling design shapes that were previously unachievable.

Various additive manufacturing processes are known, differing primarily in the way that material layers are deposited and in materials used. In particular, additive manufacturing processes can include, for example, fused deposition modeling, laser sintering, electron beam melting, and inkjet 3D printing, using materials such as thermoplastic filaments, metal powders, plaster, or resins.

However, additive manufacturing is a time intensive process that is impacted heavily by the size and complexity of the part to be generated. Accordingly, additive manufacturing has not been leveraged for high throughput, such as high volume or high quantity, manufacturing operations.

SUMMARY

The present disclosure provides a hybrid part and method of forming a hybrid part that includes a base structure with additive manufacturing material added to the base structure. In this way, a base structure may be formed by a method much faster than additive manufacturing deposited layer by layer, and then more complex features of the part may be formed on the base structure by additive manufacturing deposition layer by layer. As such, the time, complexity, and expense of creating the hybrid part may be greatly reduced from that of traditional additive manufacturing.

In one form, which may be combined with or separate from the other forms disclosed herein, a hybrid part is provided that includes a base structure comprising at least one of: a) a plurality of sheets of base material, and b) a base formed by a non-additive method. The hybrid part also includes a plurality of layers of additive manufacturing material disposed on and attached to the base structure.

In another form, which may be combined with or separate from the other forms disclosed herein, a method of forming a hybrid part includes providing a base structure comprising either or both of a plurality of sheets of base material and a base formed of a non-additive material. The method also includes disposing a plurality of layers of additive manufacturing material, layer by layer, onto the base structure.

Additional features may optionally be provided, including but not limited to the following: attaching together the plurality of sheets of base material to form the base structure; the plurality of sheets of base material being attached together with adhesive material; the adhesive material being epoxy-based tape; the base material including at least one of the following: aluminum, steel, magnesium, titanium, and a composite material; wherein the base structure further comprises a plurality of layers of adhesive material, each layer of adhesive material disposed between a pair of sheets of base material to form a laminated part; each sheet of base material having a sheet thickness in the range of 0.5 millimeter (mm) to 4.0 mm; each layer of adhesive material having an adhesive thickness in the range of 0.2 mm to 2.0 mm; each layer of additive manufacturing material having an additive layer thickness in the range of 0.02 mm to 5 mm; wherein the plurality of sheets of base material includes a first sheet formed of a first material and a second sheet formed of a second material, the first and second materials being dissimilar from one another; and wherein the base structure defines a cavity therein to decrease the mass of the base structure.

Additional features may optionally be provided, including but not limited to the following: solid state welding the plurality of layers of manufacturing material onto the base structure; disposing adhesive material between each sheet of base material to attach the plurality of sheets of base material together; forming at least one locating hole in each sheet of base material to facilitate the step of attaching together the plurality of sheets of base material; and/or rotating the base structure during the step of disposing a plurality of layers of additive manufacturing material, layer by layer, onto the base structure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a block diagram illustrating a method of forming a hybrid part, according to the principles of the present disclosure; and FIG. 5 is a block diagram illustrating another method of forming a hybrid part, in accordance with the principles of the present disclosure.

DETAILED DESCRIPTION

Figure 1:
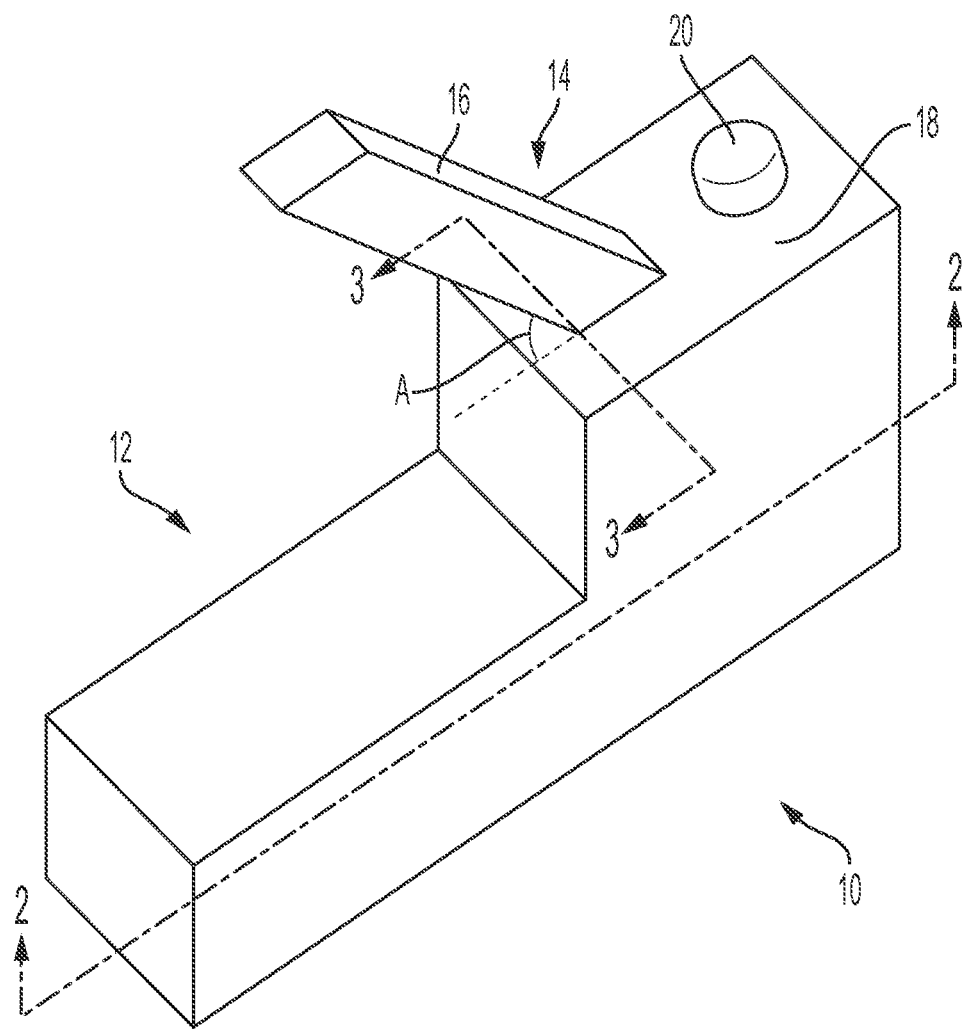
FIG. 1 is a schematic perspective view of a hybrid part, in accordance with the principles of the present disclosure.

Examples of the present disclosure are described herein. It is to be understood, however, that the disclosed examples are merely provided as an illustration of possible aspects of the disclosure, and other examples can take various and alternative forms without falling beyond the spirit and scope of the present disclosure. The figures are not necessarily to scale, and some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative examples for typical applications. Various combinations and modifications of the features consistent with the teachings of this disclosure, however, could be desired for particular applications or implementations. Furthermore, it should be understood that throughout the drawings, corresponding reference numerals indicate like or corresponding parts and features. Further, directions such as "top," "side," and "back" are used for purposes of explanation and are not intended to require specific orientations unless otherwise stated.

Referring now to FIG. 1, an exemplary hybrid part is illustrated and generally designated at 10. The hybrid part 10 includes a base structure 12 and an additive portion 14. In the illustrated example, the additive portion 14 includes a bar 16 extending at an acute angle A with respect to a top surface 18 of the base portion 12, as well as a partial sphere 20 extending from the top surface 18. As will be explained in further detail below, the additive portion 14 is formed by depositing a plurality of layers of additive manufacturing material, layer by layer, onto the base structure 12. For example, the additive portion is formed by 3D printing the layers onto the base structure 12.

The base structure 12 may be formed of any structure, for example, a structure that has a less intricate design than the additive portion 14, such that the base structure 12 may be formed by conventionally-known manufacturing techniques that may be used to form parts faster than additive manufactured parts are typically formed. Thus, the base structure 12 may be formed of a base formed by a "non-additive" method, and/or the base structure 12 may be formed of a plurality of sheets 22, which will be explained in further detail below.

Figure 3:
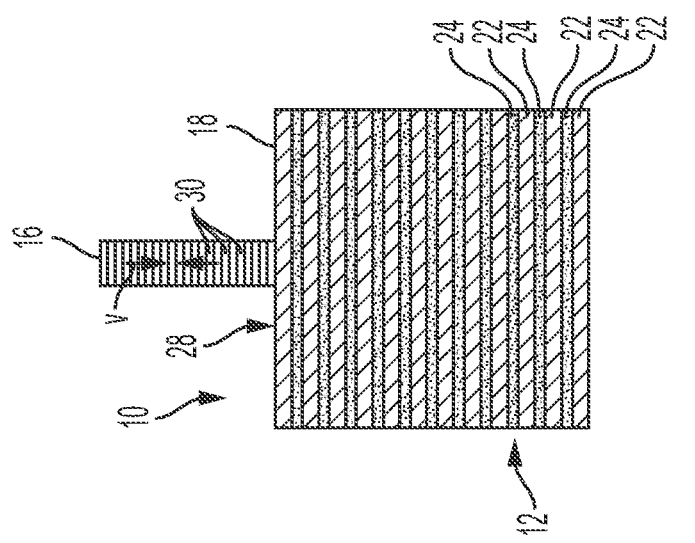
FIG. 3 is a cross-sectional view of the hybrid part of FIGS. 1-2, taken along the line 3-3 in FIG. 1, in accordance with the principles of the present disclosure.
Figure 2:
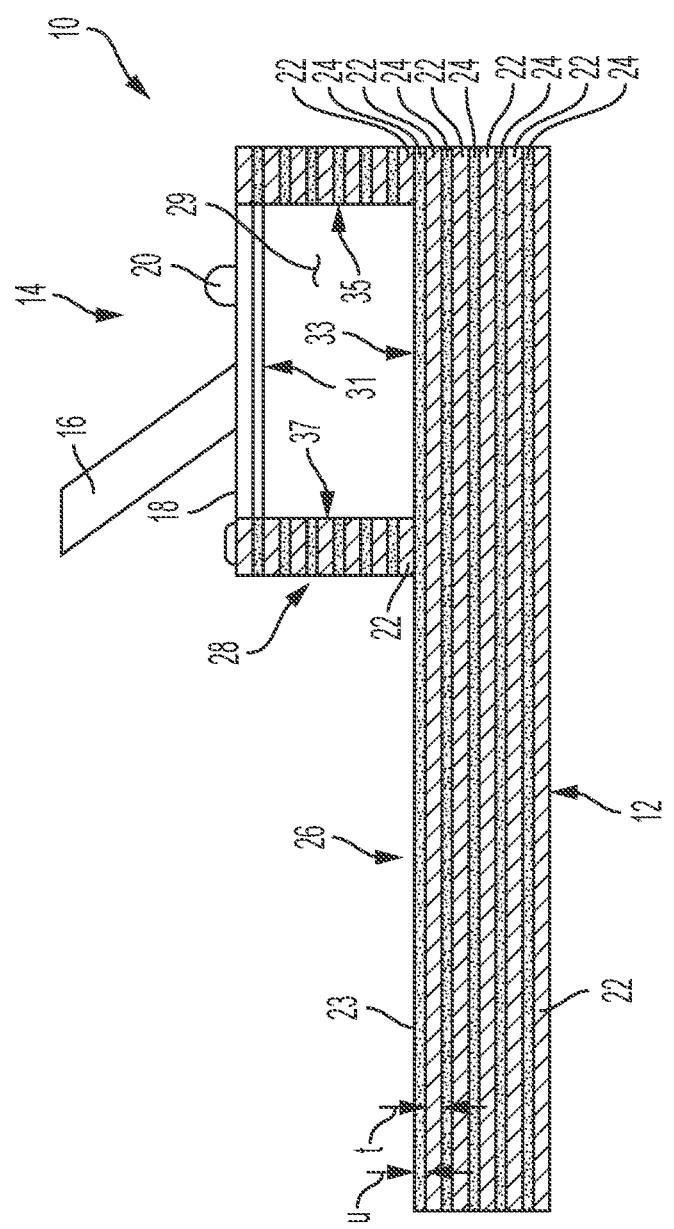
FIG. 2 is a cross-sectional view of the hybrid part of FIG. 1, taken along the line 2-2 in FIG. 1, according to the principles of the present disclosure.

Referring now to FIGS. 2 and 3, with continued reference to FIG. 1, the base structure 12 includes either or both of: a) a base formed of a non-additive material by a method other than additive manufacturing, and b) plurality of sheets 22. In the illustrated example, the base structure 12 is a laminated part that includes several sheet parts 22, such as sheet metal parts or sheets of composite material, attached together via an adhesive material 24. The adhesive material 24 may be a tape or a glue, such as an epoxy-based tape. In another variation, the adhesive material 24 could be omitted, and the sheets 22 could be joined in another way, such as by ultrasonic welding.

In the illustrated example, the base structure 12 has a long section 26 and a short section 28 stacked on the long section 26. A top side 22' of the base structure 12 may be formed of a sheet 22 or of an adhesive layer 24. Each of the sheets 22 could have various different thicknesses, if desired. Each sheet 22 preferably has a sheet thickness t in the range of 0.5 mm to 4.0 mm, and each layer of adhesive material 24 preferable an adhesive thickness u in the range of 0.2 mm to 2.0 mm, by way of example.

The sheets 22 may be formed of any desired material. For example, the sheets 22 may be sheet metal parts formed of, for example, aluminum, steel, magnesium, or titanium, or combinations thereof, or the sheets 22 may be formed of a composite material, such as carbon fiber or glass fiber. In some examples, one or more sheets 22 may be formed of a first material, and one or more sheets 22 may be formed of a second, where the first and second materials are different from one another. Additional dissimilar materials may be used for the sheets 22, if desired, and the number of different materials used for the sheets 22 is not limited to two.

To decrease the mass of the base structure 12, the base structure 12 may define a cavity 29 therein. For example, the cavity 29 may have upper and lower walls 31, 33 formed by sheets 22, and the sides 35, 37 of the cavity may be formed by a plurality of sheets 22 that are smaller sheets 22 than the sheets 22 forming the upper and lower walls 31, 33 to allow the cavity 29 to exist within the base structure 12 to save on mass.

The additive portion 14, including each of the bar 16 and the partial sphere 20, includes a plurality of layers 30 of additive manufacturing material disposed on and attached to the base structure 12, as best seen in FIG. 3. Each layer 30 of additive manufacturing material may have an additive layer thickness v in the range of 20 microns (0.02 mm) to 500 microns (0.5 mm), by way of example; and in other examples, the additive layer thickness v may be in the range of 0.02 mm to 5 mm. The additive manufacturing material may be a polymer or composite material, by way of example. Metals may also or alternatively be used, where the metals will adhere best to the base structure 12 if the same metal is used in the additive layers 30 as in the adjacent base structure sheet 22. Thus, metals used in the additive layers may include aluminum, steel, magnesium, and/or titanium, by way of example.

Referring now to FIG. 4, a block diagram illustrates a method 100 of forming a hybrid part, such as the hybrid part 10. The method 100 includes a step 102 of providing a base structure. The base structure provided in step 102 includes either or both of: a) a plurality of sheets of base material (such as the base structure 12 shown and described above), and b) a base formed by a non-additive method. The method 100 further includes a step 104 of disposing a plurality of layers of additive manufacturing material, layer by layer, onto the base structure 12. For example, the layers 30 may be disposed onto the base structure 12 to form the bar 16 and the partial sphere 20 shown above. In some forms, it is desirable to form non-intricate portions of the hybrid part 10 from the base structure material and more intricate portions of the hybrid part 10 with the additive manufacture layers.

When the base structure is a laminated part, such as the base structure 12 shown and described above, which includes adhesive layers 24, it is desirable to add the additive manufacturing layers using a solid state welding process, such as a cold spray process. In such a solid state welding process, particles of the additive manufacturing material may be accelerated at high speeds onto the base structure 12 to weld the layers 30 onto the base structure 12 and onto previous layers 30. This allows the additive layers 30 to be added without destroying or melting the adhesive layers 24. However, if the base structure 12 is formed of other materials that do not include the adhesive 24 and/or do not have the same thermal limitations as the epoxy-based adhesive described above, other additive manufacturing processes may be used, such as fused deposition modeling, laser sintering, electron beam melting, or inkjet 3D printing.

The method 100 may also include incorporating any of the features described above. For example, the method 100 may include providing the base structure 12 as including the plurality of sheets 22 of base material and attaching together the plurality of sheets 22 of base material to form the base structure 12; disposing adhesive material 24 between each sheet 22 of base material to attach the plurality of sheets 22 of base material together; providing the adhesive material 24 as epoxy-based tape attached to each adjacent sheet 22; providing the base material as including aluminum, steel, titanium, magnesium, and/or composite materials; providing each sheet 22 of base material having a sheet thickness in the range of 0.5 mm to 4.0 mm; providing each layer 24 of adhesive material having an adhesive thickness in the range of 0.2 mm to 2.0 mm; providing each layer 30 of additive manufacturing material having an additive layer thickness in the range of 0.02 mm to 5 mm; providing sheets 22 formed of different materials from one another; and defining a cavity within the base structure to decrease the mass of the base structure.

Referring now to FIG. 5, another version of a method of forming a hybrid part is illustrated and generally designed at 200. The method 200 includes a step 202 of creating the desired part, such as the hybrid part 10, in a computerized program (e.g., a computer-aided design (CAD) program such as SolidWorks, NX, Catia, or the like). The CAD file of the part 10 can be divided into layers to ultimately create the sheets 22 of the laminated base structure 12, by way of example.

The method 200 may include a step 204 of forming at least one locating hole in each sheet 22, to facilitate the step of attaching together the plurality of sheets 22 of base material. The holes may be designed in the CAD file and then created in the actual sheets 22. The holes assist with locating the sheets 22 onto a fixture to be oriented with respect to one another. Any desired number of holes may be used, such as one, two, three, or four, by way of example.

The method 200 may further include a step 206 of cutting each sheet layer 22 by any acceptable method, such as waterjets or wire electrical discharge machining (WEDM), by way of example.

The method 200 may include a step 208 of assembling each sheet layer 22 and adding the adhesive layer 24 between each sheet 22. For example, the base structure 12 may be formed layer by layer, by placing a first sheet 22, adding a first adhesive layer 24, placing a second sheet 22 on the first adhesive layer 24, adding a second adhesive layer 24 onto the second sheet 22, placing a third sheet 22 on the second adhesive layer 24, and so on. An adhesive layer 24 may be placed on top of the last sheet 22, prior to applying an additive portion 14, if desired.

The method 200 may include a step 210 of applying additive manufacturing layers 30 onto the base structure 12, such as by 3D printing. As described above with respect to the method shown in FIG. 4, the step 210 of applying additive manufacturing layers 30 may include disposing a plurality of layers 30 of additive manufacturing material, layer by layer, onto the base structure 12. For example, the layers 30 may be disposed onto the base structure 12 to form the bar 16 and the partial sphere 20 shown above. In some forms, it is desirable to form non-intricate portions of the hybrid part 10 from the base structure material and more intricate portions of the hybrid part 10 with the additive manufacture layers 30. The additive manufacturing layers 30 may be applied using a solid state welding process, such as a cold spray process, in which particles of the additive manufacturing material are accelerated at high speeds onto the base structure 12 to weld the layers 30 onto the base structure 12 and onto previous layers 30.

The method 200 may optionally include a step 212 of rotating the base structure 12 during the step 210 of disposing the plurality of layers 30 of additive manufacturing material, layer by layer, onto the base structure 12. As such, 3D printed portions can be added to multiple sides of the base structure 12.

The method 200 may then include a step 214 of curing the hybrid part 10. For example, the hybrid part 10 may be cured at a temperature that is hot enough to cure the additive manufacturing material, but not so hot that the adhesive layers 24 are destroyed. In some forms, the curing temperature may be in the range of 130-190 degrees Celsius. In an example, the curing temperature may be approximately 160 degrees Celsius. The part 10 may be cured for 20 minutes to one hour, by way of example. The method 200 may optionally include a step 216 of machining the hybrid part 10 after the curing step 214.

The additive manufacturing material used in the additive layers 30 may be comprised of a single material or of different material(s) presented at the various layers.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A method of forming a hybrid part, the method comprising:
   providing a base structure comprising a plurality of sheets of base material formed by a non-additive method from sheet metal or composite material sheets, the sheets of base material being arranged in a stack and laminated together to form the base structure; and
   disposing a plurality of layers of additive manufacturing material, layer by layer, onto the base structure, the disposing including solid state welding the plurality of layers of additive manufacturing material onto the base structure.

2. The method of claim 1, wherein providing the base structure includes: providing the plurality of sheets of base material; and attaching together the plurality of sheets of base material to form the base structure.

3. The method of claim 2, wherein attaching together the plurality of sheets of base material includes: disposing adhesive material between each of the sheets of base material; and placing each of the sheets of base material on the adhesive material.

4. The method of claim 3, further comprising providing the adhesive material as epoxy-based tape.

5. The method of claim 4, further comprising providing the base material as including at least one of the following: aluminum, steel, and a composite material.

6. The method of claim 3, further comprising:
   providing each of the sheets of base material having a sheet thickness in the range of 0.5 mm to 4.0 mm;
   providing the adhesive material as a plurality of adhesive layers each having an adhesive thickness in the range of 0.2 mm to 2.0 mm; and
   providing each of the layers of additive manufacturing material having an additive layer thickness in the range of 0.02 mm to 5 mm.

7. The method of claim 1, wherein the plurality of sheets of base material includes a first sheet formed of a first material and a second sheet formed of a second material, the first and second materials being dissimilar from one another.

8. The method of claim 1, further comprising defining a cavity within the base structure.

9. The method of claim 2, further comprising forming a locating hole in each of the sheets of base material to facilitate the step of attaching together the plurality of sheets of base material.

10. The method of claim 1, further comprising rotating the base structure during the step of disposing a plurality of layers of additive manufacturing material, layer by layer, onto the base structure.

11. The method of claim 1, wherein the base structure includes a first base section adjoining a second base section, the first base section having a first height, and the second base section having a second height greater than the first height.

12. The method of claim 11, wherein the first base section has a first length and the second base section has a second length less than the first length.

13. The method of claim 11, wherein the first base section includes a first number of the sheets of base material and the second base section includes a second number of the sheets of base material greater than the first number of the sheets of base material.

14. The method of claim 1, wherein disposing the plurality of layers of additive manufacturing material forms a bar and/or a protrusion projecting from a surface of the base structure.

15. The method of claim 14, wherein the bar has a polyhedral shape and projects at an acute angle from the surface of the base structure.

16. The method of claim 14, wherein the protrusion has a hemispherical shape and projects orthogonally from the surface of the base structure.

17. The method of claim 1, wherein a subset of the sheets of base material each has a hollow center such that the subset of the sheets, when stacked, collectively define an internal cavity inside the base structure.

18. A method of forming a hybrid part, the method comprising:
forming a base structure including:
providing a plurality of sheets of base material;
disposing adhesive material between the sheets of base material; and
placing each of the sheets of base material on the adhesive material to thereby attach together the sheets of base material and form the base structure; and
disposing a plurality of layers of additive manufacturing material, layer by layer, onto the base structure.

19. The method of claim 18, wherein the step of disposing the plurality of layers of additive manufacturing material, layer by layer, onto the base structure comprises solid state welding the plurality of layers of additive manufacturing material onto the base structure.

20. A method of forming a hybrid part, the method comprising:
providing a plurality of sheets of base material;
forming a locating hole in each of the plurality of sheets of base material;
locating the plurality of sheets of base material with respect to one another using the locating holes;
attaching together the sheets of base material to form a base structure; and
disposing a plurality of layers of additive manufacturing material, layer by layer, onto the base structure.

* * * * *